US012641290B2

(12) United States Patent
Zhao et al.

(10) Patent No.: US 12,641,290 B2
(45) Date of Patent: May 26, 2026

(54) EFFICIENT TRANSFORM SIGNALING FOR SMALL BLOCKS

(71) Applicant: GOOGLE LLC, Mountain View, CA (US)

(72) Inventors: Jin Zhao, Mountian View, CA (US); In Suk Chong, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 51 days.

(21) Appl. No.: 18/753,532

(22) Filed: Jun. 25, 2024

(65) Prior Publication Data

US 2025/0008158 A1     Jan. 2, 2025

Related U.S. Application Data

(60) Provisional application No. 63/524,010, filed on Jun. 29, 2023.

(51) Int. Cl.
H04N 19/00       (2014.01)
H04N 19/12       (2014.01)
H04N 19/176      (2014.01)
H04N 19/625      (2014.01)

(52) U.S. Cl.
CPC ........... H04N 19/625 (2014.11); H04N 19/12 (2014.11); H04N 19/176 (2014.11)

(58) Field of Classification Search
CPC .... H04N 19/625; H04N 19/12; H04N 19/176; H04N 19/119; H04N 19/122; H04N 19/70
See application file for complete search history.

(56) References Cited

U.S. PATENT DOCUMENTS

| | | | | | |
|---|---|---|---|---|---|
| 10,554,953 | B2 * | 2/2020 | Raphael | ............... | H04N 13/261 |
| 10,560,752 | B2 * | 2/2020 | Eronen | ................. | G06T 19/006 |
| 11,303,874 | B2 * | 4/2022 | Phillips | .............. | H04N 21/2662 |
| 11,395,003 | B2 * | 7/2022 | Han | ...................... | H04N 23/698 |
| 11,490,063 | B2 * | 11/2022 | Phillips | .......... | H04N 21/234345 |
| 2018/0302604 | A1 * | 10/2018 | Zhou | ..................... | H04N 19/176 |
| 2019/0102944 | A1 * | 4/2019 | Han | ......................... | G06F 3/012 |
| 2019/0313119 | A1 * | 10/2019 | Han | ...................... | H04N 19/174 |
| 2020/0099924 | A1 * | 3/2020 | Seregin | ................ | H04N 19/134 |
| 2022/0329800 | A1 * | 10/2022 | Ray | ....................... | H04N 19/176 |

* cited by examiner

*Primary Examiner* — Frank F Huang

(74) *Attorney, Agent, or Firm* — Young Basile Hanlon & MacFarlane, P.C.

(57)          ABSTRACT

A size of a transform block is identified. A transform type for the transform block is identified. The transform type includes a horizontal transform type and a vertical transform type. Identifying the transform type includes determining whether the size of the transform block is below a predefined block size; and, in response to determining that the size is below the predefined block size, selecting a default transform type for each of the horizontal transform type and the vertical transform type. The transform type is then applied to the transform block. The default transform type can be the discrete cosine transform (DCT).

20 Claims, 9 Drawing Sheets

IDENTIFY A SIZE OF A TRANSFORM BLOCK

804

SELECT A HORIZONTAL TRANSFORM TYPE
AND A VERTICAL TRANSFORM TYPE FOR
CODING THE TRANSFORM BLOCK

YES

806

APPLY THE HORIZONTAL TRANSFORM TYPE
AND THE VERTICAL TRANSFORM TYPE

EFFICIENT TRANSFORM SIGNALING FOR SMALL BLOCKS

CROSS REFERENCE TO RELATED APPLICATION(S)

This application claims the benefits of U.S. Provisional Patent Application Ser. No. 63/524,010, filed Jun. 29, 2023, the entire disclosure of which is incorporated herein by reference.

BACKGROUND

Digital video streams may represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A first aspect of the disclosed implementations is a method for coding a transform block. The method includes identifying a size of the transform block; identifying a transform type for the transform block where the transform type comprises a horizontal transform type and a vertical transform type; and applying the transform type to the transform block. Identifying the transform type includes determining whether the size of the transform block is below a predefined block size; and, in response to determining that the size is below the predefined block size, selecting a default transform type for each of the horizontal transform type and the vertical transform type. The method may include determining based on the size of the transform block that the transform block is not split into sub-blocks. The method may include inferring a syntax element indicating whether the transform block is split into sub-blocks based on the size.

A second aspect of the disclosed implementations is a device that includes a processor. The processor is configured to execute instructions for coding a transform block. The instructions include to identify a size of the transform block; identify a transform type for the transform block, where the transform type includes a horizontal transform type and a vertical transform type; and apply the transform type to the transform block. The instructions to identify the transform type include to determine whether the size of the transform block is below a predefined block size; and, in response to determining that the size is below the predefined block size, select a default transform type for each of the horizontal transform type and the vertical transform type.

A third aspect of the disclosed implementations is a non-transitory computer-readable storage medium having stored thereon an encoded bitstream. The encoded bitstream is configured for decoding by operations that include identifying a size of the transform block; identifying a transform type for the transform block where the transform type comprises a horizontal transform type and a vertical transform type; and applying the transform type to the transform block. Identifying the transform type includes determining whether the size of the transform block is below a predefined block size; and, in response to determining that the size is below the predefined block size, selecting a default transform type for each of the horizontal transform type and the vertical transform type. The method may include determining based on the size of the transform block that the transform block is not split into sub-blocks. The method may include inferring a syntax element indicating whether the transform block is split into sub-blocks based on the size.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below, wherein like reference numerals refer to like parts throughout the several views.

FIG. 6B is a diagram that illustrates an example of transform block partitioning for inter-coded blocks.

DETAILED DESCRIPTION

Figure 1:
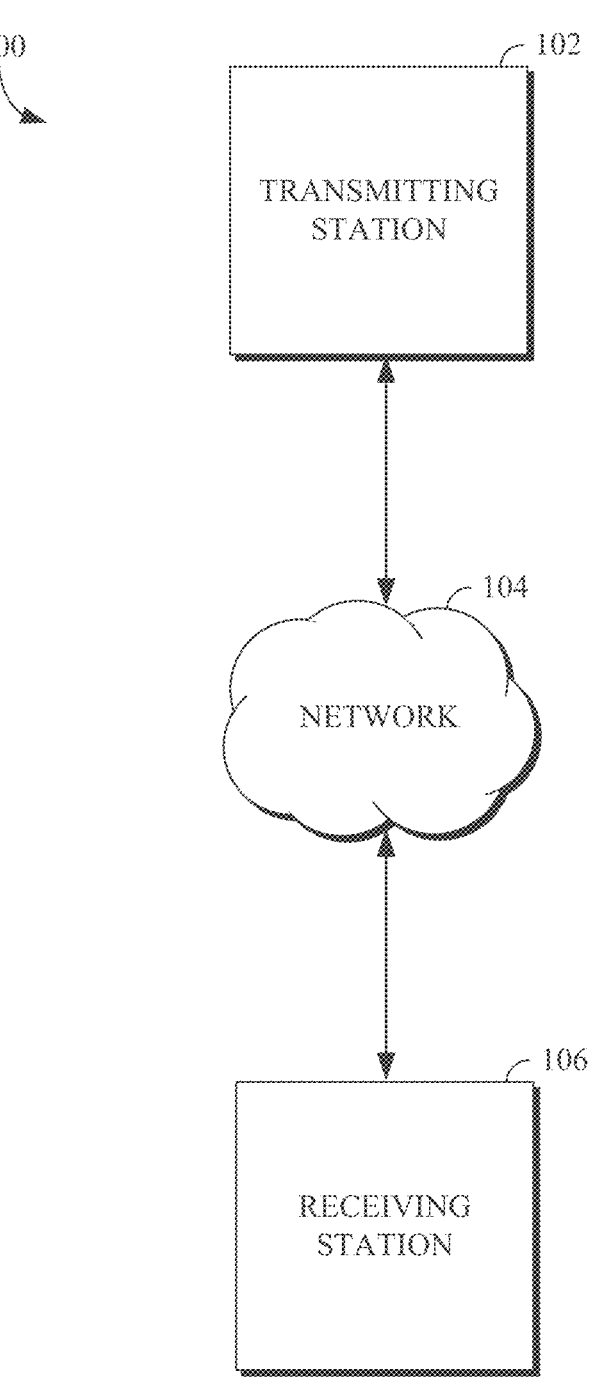
FIG. 1 is a schematic of a video encoding and decoding system.

Video compression schemes may include breaking respective images, or video frames, into smaller portions, such as video blocks, and generating an encoded bitstream using techniques to limit the information included for respective video blocks thereof. The encoded bitstream can be decoded to re-create the source images from the limited information. Encoding or decoding a video block can include predicting motion within that video block, such as with respect to one or more other video blocks in the same video frame or in a different video frame.

As further described herein, transform coding can be applied to a prediction residual, such as to remove spatial correlations in the residual block. A block (e.g., a prediction block), which may be an intra or an inter prediction block, can be further partitioned into multiple transform blocks. The partitioning may be recursive. That is, the partitioning can have depth (e.g., up to two or more levels of depth). An encoder, such as the encoder 400 of FIG. 4, determines (and may code in a compressed bitstream), and a decoder may obtain (e.g., decode from the compressed bitstream or infer) the transform block partitioning.

Different transform kernels may be available in a codec. To illustrate, and without limitations, four (4) transform kernels are available in the Alliance for Open Media (AO-Media) Video 1 (AV1) codec. Each of the transform kernels may be separately selected for each of the horizontal dimension and the vertical dimension of a transform block. As such, sixteen (16) transform kernel combinations are possible in AV1.

That a transform kernel is applied to the horizontal (vertical) dimension of a transform block means that the transform kernel is applied to the rows (columns) of the transform block. A transform type, as used herein, refers to a combination of a horizontal kernel and a vertical kernel. A transform kernel applied horizontally (i.e., to rows) is referred to herein as a horizontal transform type; and a transform kernel applied vertically (i.e., to columns) is referred to herein as a vertical transform type. As is known, an encoder applies a transform to convert spatial pixel data into frequency data, which may then be quantized and encoded for transmission or storage; and a decoder then performs the inverse of that transform to convert the frequency data back into spatial pixel data, such as for display. However, for brevity, a transform kernel and its inverse may be both referred to as a transform kernel herein.

Typically, the encoder selects and encodes the transform type for a transform block. The encoder may select the transform type based on statistics of a transform type. The transform type may be encoded in the header of the block. Thus, if each of the combinations were to be possible for a transform block, then 4 bits (i.e., 24=16) would be required to encode the transform type for a block. However, to reduce the number of bits required to code the transform type, AV1 divides the possible combinations of kernels into subsets of transform types.

Which of the subsets is available to a transform block may depend on whether the coding block corresponding to the transform block is inter or intra predicted and on the size of the transform block. To illustrate, and without limitations, if a coding block were intra-predicted and the transform block size is 16×16, then the subset of available transform types may include only 5 transform types. As such, only 3 bits (instead of 4) would be required to code the transform type for this block. In another illustration, if a coding block is inter-predicted and the transform block size is 32×32, then the subset of available transform types may include only 2 transform types. As such, only 1 bit (instead of 4) would be required to code the transform type for this block.

It has been observed that, for smaller transform blocks where the coding blocks are inter-predicted, certain transform types may not produce sufficient compression gains or sufficient distortion reduction to justify the signaling costs. That is, making more transform types available for such smaller blocks (and therefore the number of bits required for signaling a selected transform type) outweigh the compression gains or distortion reduction provided by some of these transform types. As such, it is desirable to reduce the available transform types for smaller transform blocks that are inter-predicted block. That a transform block is inter-prediction means that the coding block that includes the transform block is inter-predicted. That a coding block is inter-predicted means that the coding block is coded based on a reference frame, a motion vector, or both.

Implementations of efficient transform signaling for small blocks, as described herein, reduce or completely remove the signaling costs associated with transform types for small transform blocks. Residuals for such (small) transform blocks are relatively small and the signaling of many available transform types may not be justified. Furthermore, reducing the number of possible transform types for certain blocks, as described here, results in performance gains at the encoder since only a limited number of transform types are evaluated by the encoder (e.g., instead of, for example, 16).

In an example, if the size of a (luma) transform block is sub-8×8 (i.e., the size is one of 4×8, 8×4, and 4×4), then a default transform type (e.g., DCT) can be assumed (i.e., inferred and not coded/signaled) for each of the horizontal and the vertical directions. In an example, if one dimension of the transform block is equal to a minimum threshold transform dimension size, then the default transform type can be assumed (i.e., inferred and not coded/signaled) for that dimension. To illustrate, assuming that the minimum threshold transform dimension size is equal to 4, then transform blocks having sizes 4×N (where N>8) can be restricted to use the default transform type in the horizontal direction. In yet another example, the subset of available transform types available for a transform block can depend on the particular prediction mode of containing coding block and the size of the transform block.

In an another example, if a coding unit has a certain size, then that coding unit may not be partitioned into multiple transform blocks. To illustrate, if a coding unit has a size of transform blocks of 4×8 or 8×4, then the coding unit may not be split into 2 4×4 transform blocks. For example, if the coding unit is inter-coded and has a size of 16×16, or if the coding unit is intra-predicted and has a size of 8×8, then the coding unit is not split into multiple transform block. Rather, the transform block is coextensive with the coding unit.

Further details of techniques for video coding using efficient transform signaling for small blocks are described herein with initial reference to a system in which they can be implemented. FIG. 1 is a schematic of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
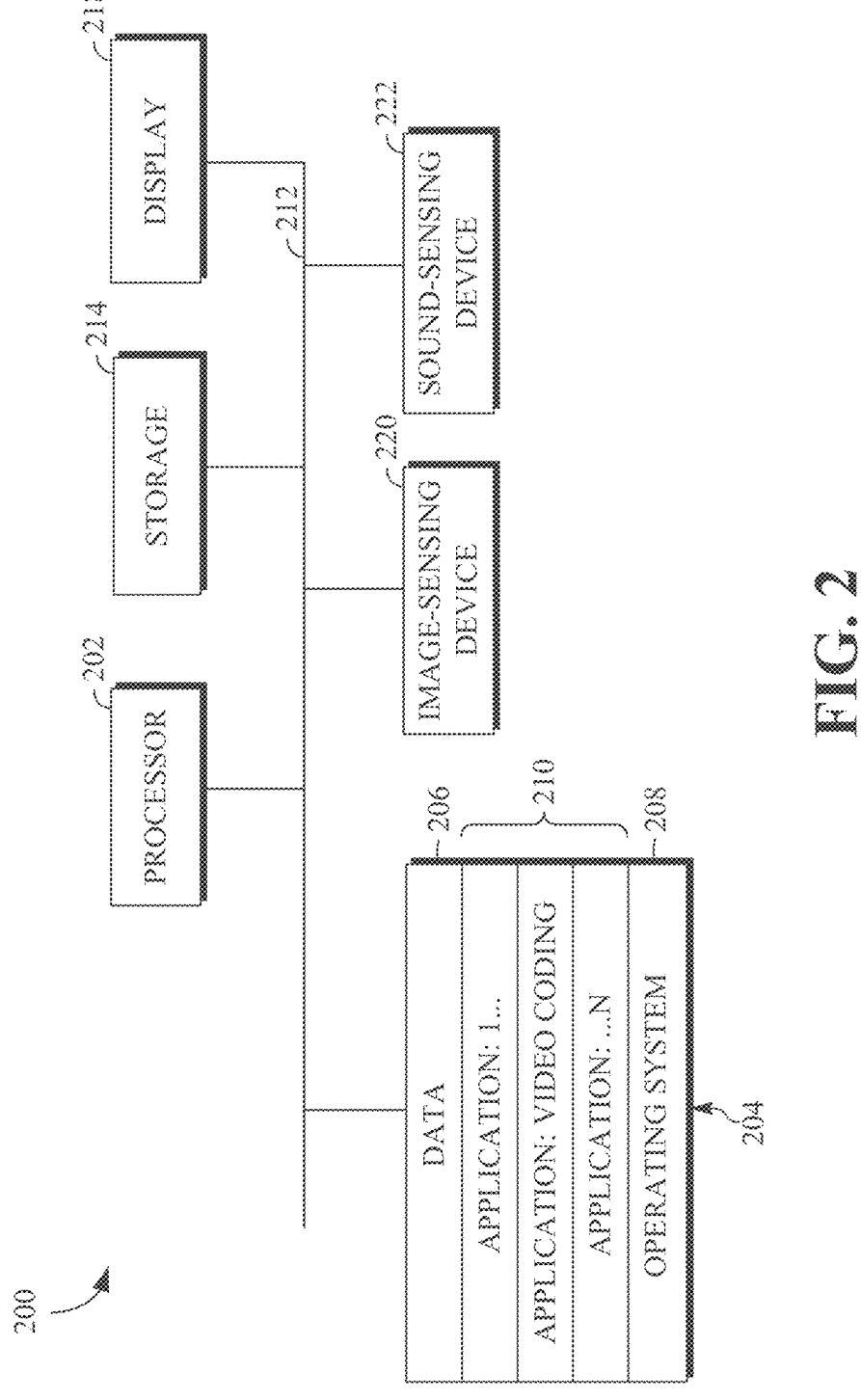
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random-access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video coding application that performs the techniques described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
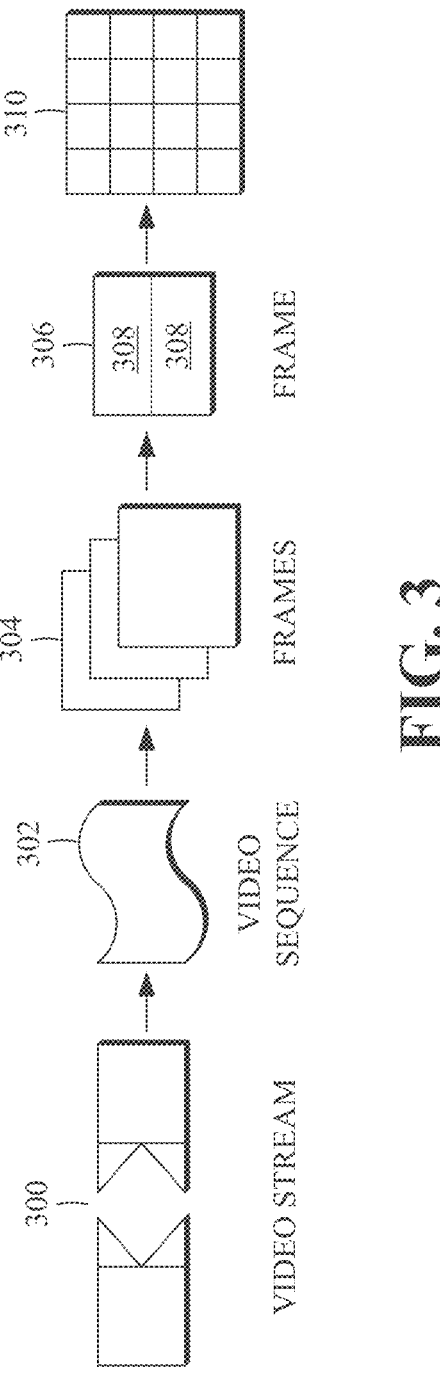
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
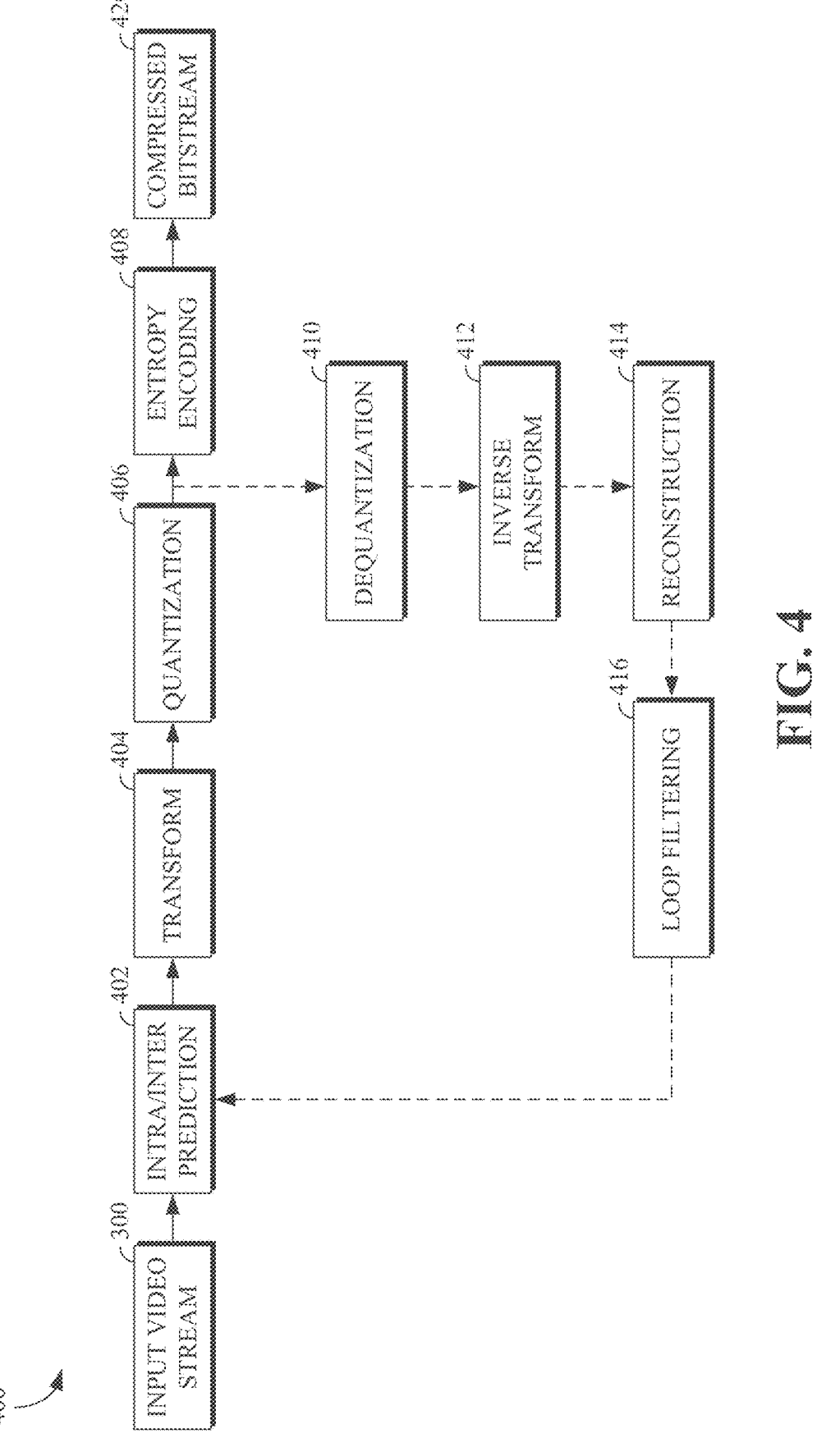
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. In some implementations, a non-transform-based encoder can quantize the residual signal directly without the transform stage 404 for certain blocks or frames. In some implementations, an encoder can have the quantization stage 406 and the dequantization stage 410 combined in a common stage.

Figure 5:
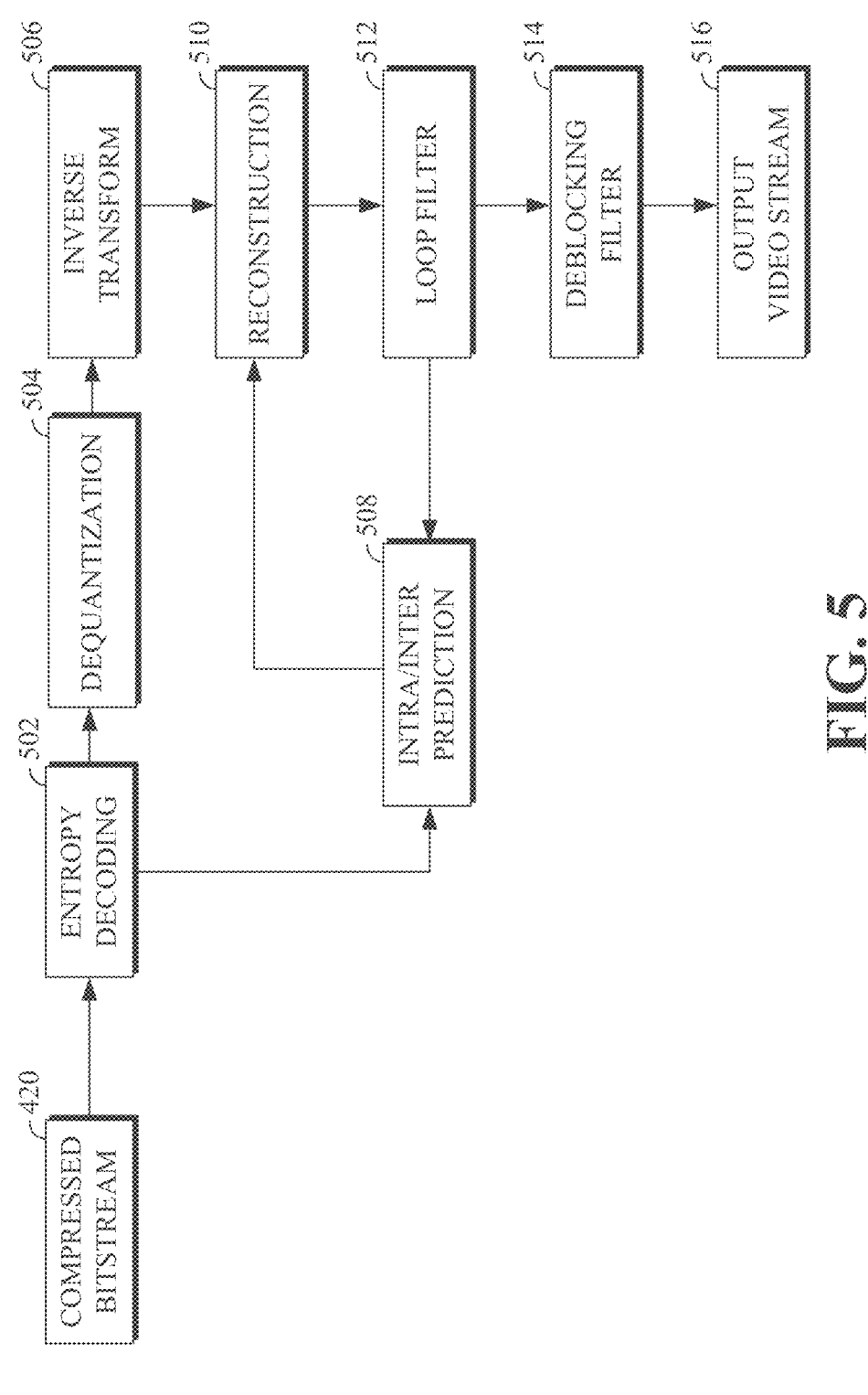
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. In some implementations, the decoder 500 can produce the output video stream 516 without the deblocking filtering stage 514.

Figure 6A:
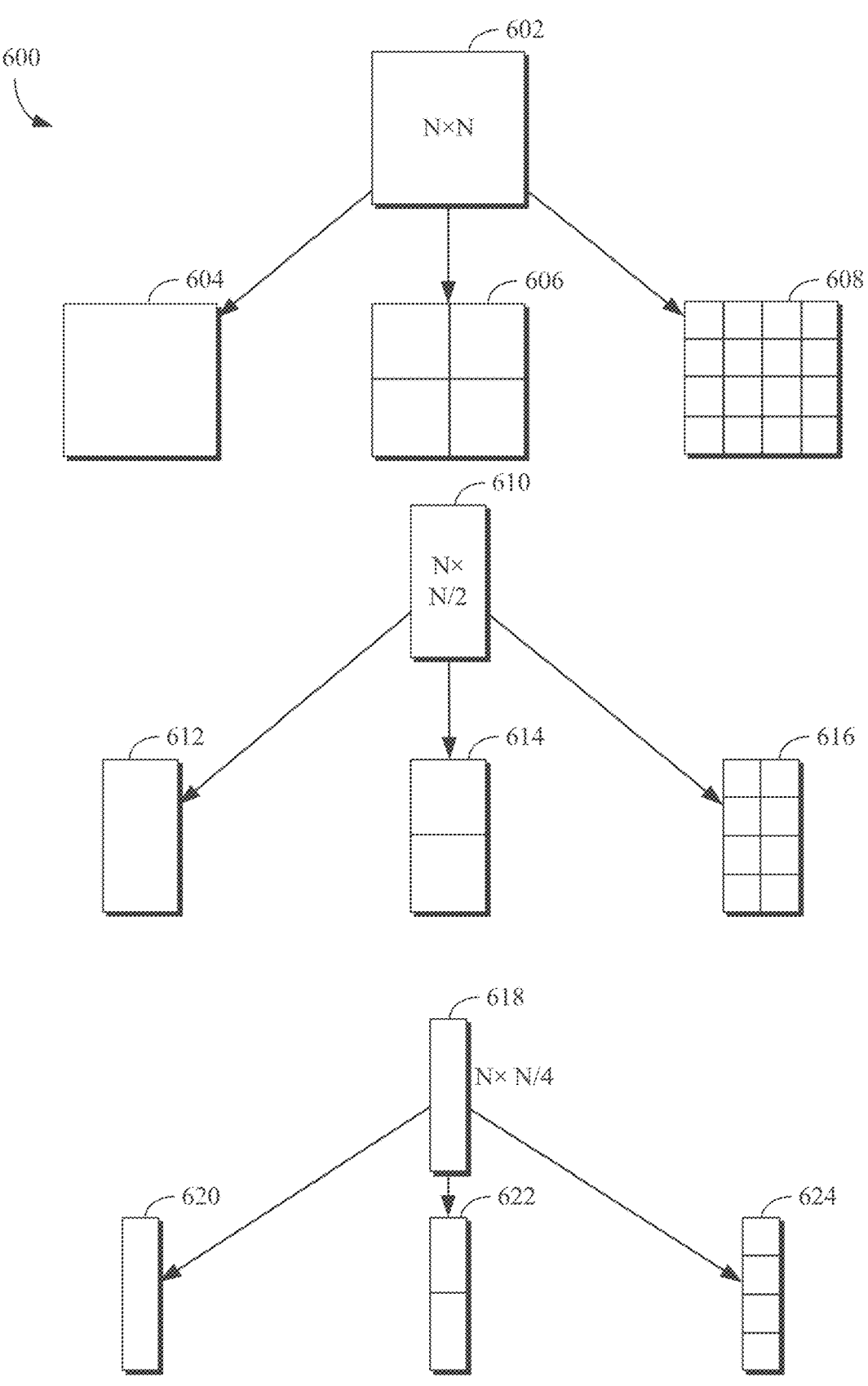
FIG. 6A is a diagram that illustrates an example of transform block partitioning for intra-coded blocks.
Figure 6B:
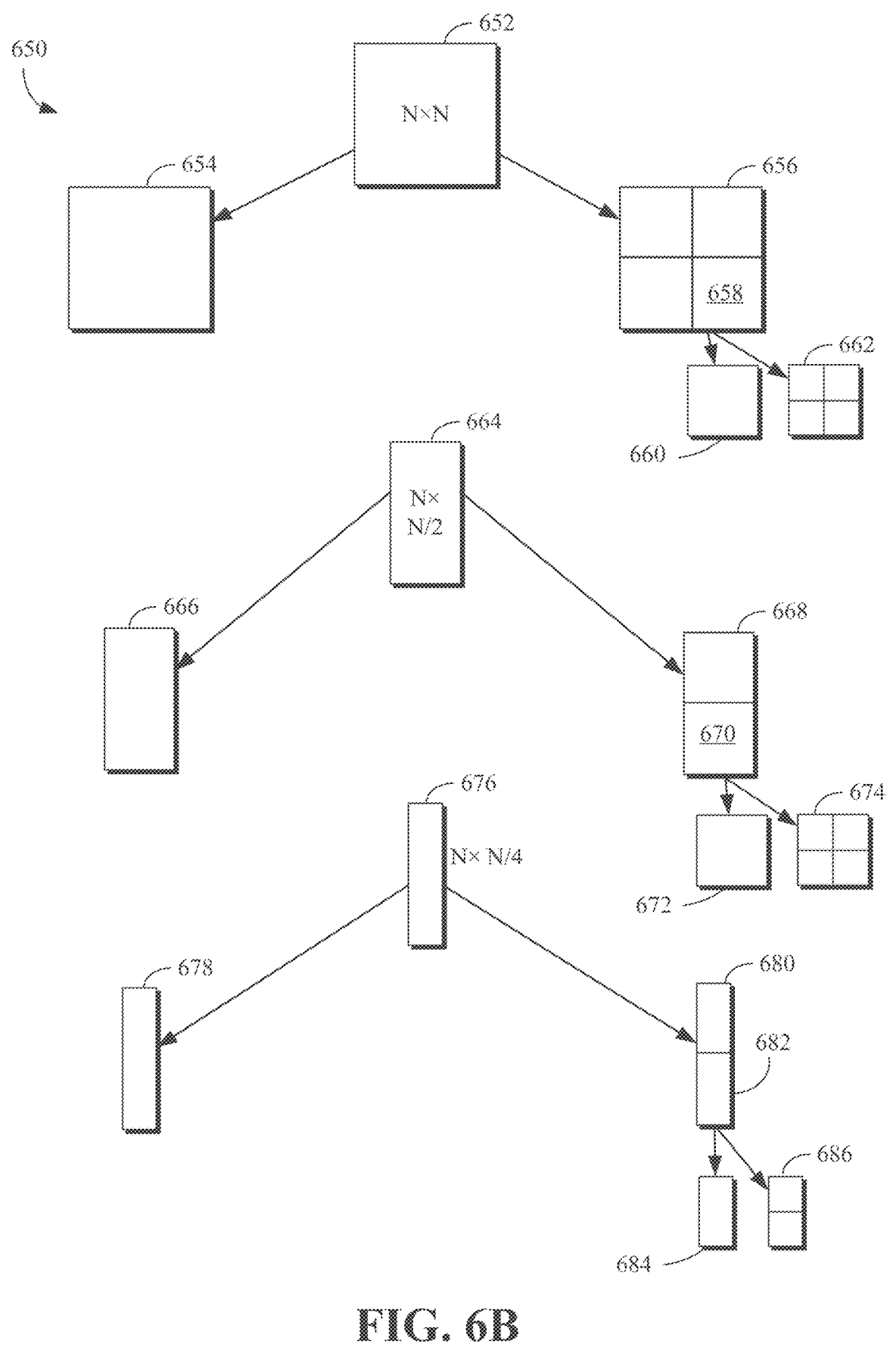

FIG. 6A is a diagram 600 that illustrates an example of transform block partitioning for intra-coded blocks, and FIG. 6B is a diagram 650 that illustrates an example of transform block partitioning for inter-coded blocks. It is noted that the partitionings described with respect to FIGS. 6A and 6B are for illustration purposes only and the disclosure herein is not limited to or by any particular partitioning strategy. For example, while recursive partitioning is described herein, some codecs may not perform recursive partitioning of transform units.

In an example a maximum transform block size may be 64×64 and a minimum transform block size may be 4×4. However, other maximum and minimum transform block sizes are possible. An encoder may split an M×M residual block into 1 M×M transform block, into 2 M×M/2 transform blocks, 2 M/2×M transform blocks, into 4 M×M/4 transform blocks, or into 4 M/4×M transform blocks. As such a transform block can be square or rectangular.

FIG. 6A illustrates the possible recursive partitions for N×N, N×N/2, and N×N/4 coding blocks that are intra-coded. The possible partitioning of N/2×N and N/4×N coding blocks are easily derivable from the possible partitions of the N×N/2 and N×N/4 partitions. The maximum transform block size matches the coding block size and can go up to two levels down for the luma component. The available options for square and rectangular coding block sizes are shown in FIG. 6A.

A coding block 602 of size N×N may be partitioned into a transform sub-block 604 that includes only one transform block of size N×N, into 4 transform sub-blocks 606 that include 4 N/2×N/2 transform blocks, or into 16 transform sub-blocks 608 that include 16 N/4×N/4 transform blocks. A coding block 610 of size N×N/2 may be partitioned into a transform sub-block 612 that includes only one transform block of size N×N/2, into 2 transform sub-blocks 614 that include 2 N/2×N/2 transform blocks, or into 8 transform sub-blocks 616 that include 8 N/4×N/4 transform blocks. A coding block 618 of size N×N/4 may be partitioned into a transform sub-block 620 that includes only one transform block of size N×N/4, into 2 transform sub-blocks 622 that include 2 N/2×N/4 transform blocks, or into 4 transform sub-blocks 624 that include 4 N/4×N/4 transform blocks.

FIG. 6B illustrates the possible recursive partitions for N×N, N×N/2, and N×N/4 coding blocks that are inter-coded. The possible partitioning of N/2×N and N/4×N coding blocks are easily derivable from the possible partitions of the N×N/2 and N×N/4 partitions. For the luma component, and in an example, up to two levels of transform block partitioning may be possible.

An encoder, such as the encoder 400 of FIG. 4, may partition a transform block for inter-predicted blocks so that localized stationary regions can be captured (identified) for transform coding efficiency. In the case of inter-blocks, the partitioning may be recursive. The initial transform block size can match the coding block size (or, equivalently, the residual block size). In an example, if the coding block size is greater than the maximum transform block size (e.g., 64×64), then transform blocks of sizes equal to the maximum transform block size can be used. To illustrate, if the coding block has a size of 128×128, then the encoder divides the coding block into 4 64×64 transform blocks.

A coding block 652 of size N×N may be partitioned into a transform sub-block 654 that includes only one transform block of size N×N, or into 4 transform sub-blocks 656 that include 4 N/2×N/2 transform blocks. Each of the subblocks of the transform sub-blocks 656 can be similarly further partitioned. For example, a sub-block 658 can be further partitioned into 1 sub-block 660 of size N/2×N/2 or into 4 transform sub-blocks 662, each of size N/4×N/4.

A coding block 664 of size N×N/2 may be partitioned into a transform sub-block 666 that includes only one transform block of size N×N/2, or into 2 transform sub-blocks 668 that include 2 N/2×N/2 transform blocks. Each of the subblocks of the transform sub-blocks 668 can be similarly further partitioned. For example, a sub-block 670 can be further partitioned into 1 sub-block 672 of size N/2×N/2 or into 2 transform sub-blocks 674, each of size N/4×N/4.

A coding block 676 of size N×N/4 may be partitioned into a transform sub-block 678 that includes only one transform block of size N×N/4, or into 2 transform sub-blocks 680 that include 2 N/2×N/4 transform blocks. Each of the subblocks of the transform sub-blocks 680 can be similarly further partitioned. For example, a sub-block 682 can be further partitioned into 1 sub-block 684 of size N/2×N/4 or into 2 transform sub-blocks 686, each of size N/4×N/4.

As already mentioned, each of the transform blocks can have an associated transform type. To be clear, that a residual block is split into transform blocks means that a transform type is applied to that portion of the residual block coextensive with the transform block. As also already mentioned, at the encoder, a transform type is applied to the a portion of the residual block corresponding to (i.e., that is coextensive with) the transform block to obtain a transform-domain (or frequency domain) block; and at the decoder, the transform type (more accurately, the inverse of the transform type) is applied to the transform-domain block to obtain that portion of the residual block in the pixel domain.

Each transform block can have associated therewith a transform type. The transform type can include a horizontal transform type (e.g., a kernel) to be applied to the rows of the transform block and a vertical transform type (e.g., a kernel) to be applied to the columns of the transform block, independently. A separable two-dimensional (2D) transform process can be applied to prediction residuals. For the forward transform (e.g., at an encoder), a one-directional (1D) vertical transform is first performed on each column of the input residual block, then a horizontal transform is performed on each row of the vertical transform output. For the backward transform (e.g., at a decoder), a 1D horizontal transform is first performed on each row of the input dequantized coefficient block, then a vertical transform is performed on each column of the horizontal transform output.

In an example, the transform kernels available in a coded, such as the AV1 codec, may include four different types of transforms: a discrete cosine transform (DCT), an asymmetric discrete cosine transform (ADST), a flipped version of the ADST (FLIPADST), and an identity transform (IDT). Each of these transforms (i.e., kernels) may be available at different points. For example, 4-, 8-, 16-, 32-, and 64-point DCT kernels may be available; 4-, 8-, and 16-point ADST and FLIPADST kernels may be available; and 4-, 8-, 16-, and 32-point identity transforms (IDTs) may be available. Again, more, fewer, or other kernels are possible.

The DCT kernel is widely used in signal compression and is known to approximate the optimal linear transform, the Karhunen-Loeve transform (KLT), for consistently correlated data. The ADST, on the other hand, approximates the KLT where one-sided smoothness is assumed and can be naturally suitable for coding, inter alia, some intra-prediction residuals. Similarly, the FLIPADST can capture one-sided smoothness from the opposite end. The IDT can be used to accommodate situations where sharp transitions are contained in the block and where neither DCT nor ADST is effective. Also, the IDT, combined with other 1-D transforms, provides the 1-D transforms themselves, therefore allowing for better compression of horizontal and vertical patterns in the residual.

Accordingly, the fixed transform types that are available include sixteen 2D transforms comprising combinations of four 1D transforms as follows: DCT_DCT (transform rows with DCT and columns with DCT), ADST_DCT (transform rows with ADST and columns with DCT), DCT_ADST (transform rows with DCT and columns with ADST), ADST_ADST (transform rows with ADST and columns with ADST), FLIPADST_DCT (transform rows with FLI-PADST and columns with DCT), DCT_FLIPADST (transform rows with DCT and columns with FLIPADST), FLI-PADST_FLIPADST (transform rows with FLIPADST and columns with FLIPADST), ADST_FLIPADST (transform rows with ADST and columns with FLIPADST), FLIPAD-ST_ADST (transform rows with FLIPADST and columns with ADST), IDT (transform rows with identity and columns with identity), V_DCT (transform rows with identity and columns with DCT), H_DCT (transform rows with DCT and columns with identity), V_ADST (transform rows with identity and columns with ADST), H_ADST (transform rows with ADST and columns with identity), V_FLIPADST (transform rows with identity and columns with FLI-PADST), and H_FLIPADST (transform rows with FLI-PADST and columns with identity).

Figure 7:
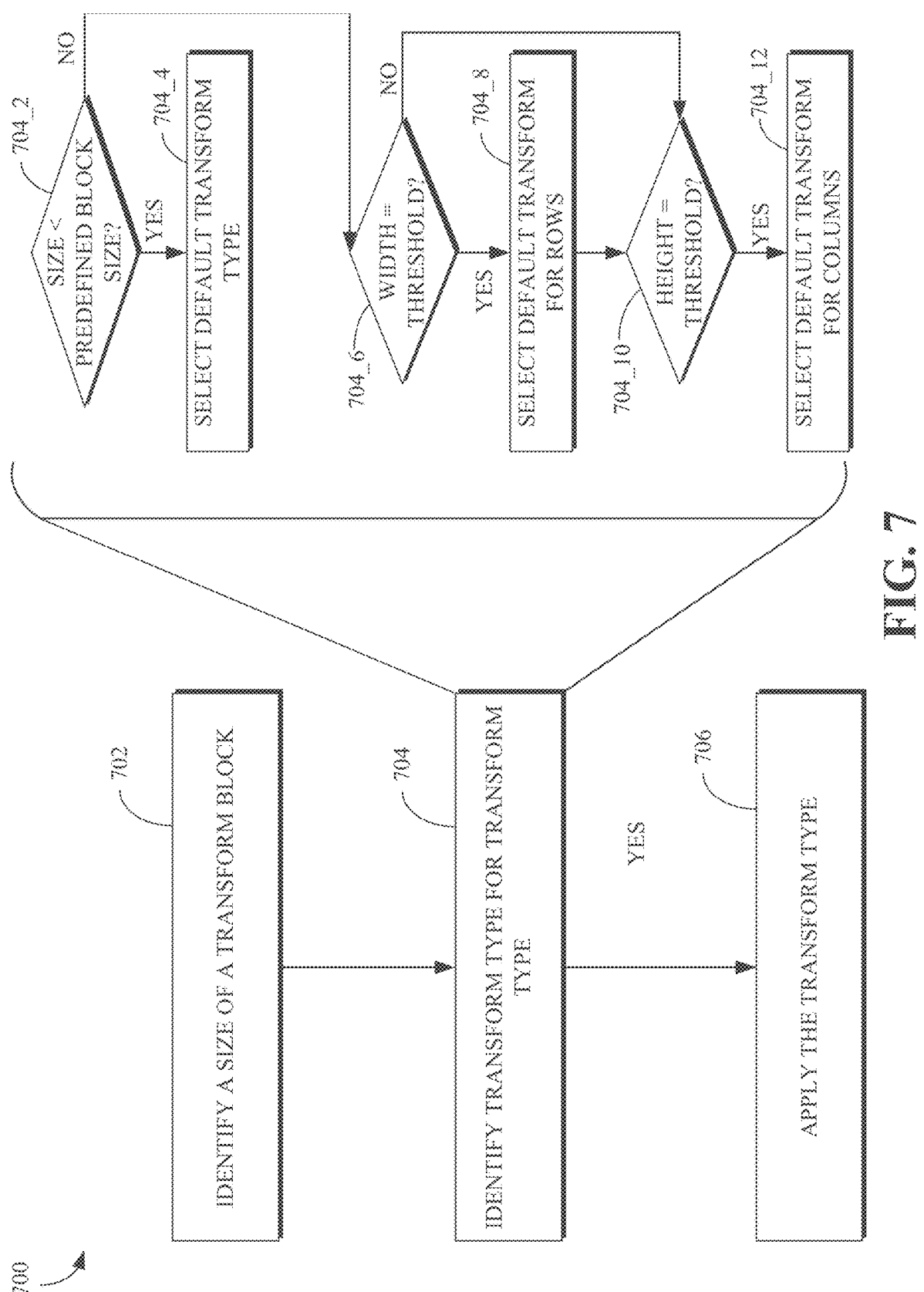
FIG. 7 is a flowchart of a technique for coding a transform block.

FIG. 7 is a flowchart of a technique 700 for coding a transform block. The technique 700 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as the processor 202, may cause the computing device to perform the technique 700. The technique 700 can be implemented using specialized hardware or firmware. Multiple processors, memories, or both, may be used.

The technique 700 may be implemented in whole or in part in the transform stage 404 of the encoder 400 of FIG. 4 and/or the inverse transform stage 506 of the decoder 500 of FIG. 5. When implemented by an encoder, coding a transform block can mean applying a transform, as described with respect to FIG. 4; and when implemented by a decoder, coding a transform block can mean applying an inverse of the transform, as described with respect to FIG. 5.

At 702, a size of the transform block is identified. When implemented at the decoder, the size of the transform block may be decoded from the compressed bitstream. At 704, a transform type is identified for the transform block. The transform type can include a horizontal transform type and a vertical transform type. Identifying the transform type can include determining whether the size of the transform block is below a predefined block size; and, in response to determining that the size is below the predefined block size, a default transform type for each of the horizontal transform type and the vertical transform type can be selected. To illustrate, and assuming that the predefined block size is 8×8 and that the default transform type is the DCT, then for transform blocks of sizes 8×8, 4×8, and 8×4, the DCT_DCT transform type is used.

Identifying the transform type can further include, in response to determining that the size is not below the predefined block size and that one of the width or the height of the transform block is equal to a threshold size, selecting the default transform type for the least one of the width or the height of the transform block that is equal to the threshold size. To illustrate, and assuming that the threshold size is 4 and that the default transform type is the DCT, then for transform blocks of sizes 4×N and N×4 (where N>8), the DCT transform type is selected for the horizontal and vertical dimensions, respectively. Table I is an illustrative pseudocode for selecting the DCT transform type for the horizontal or vertical dimension and coding the transform type for the other direction.

TABLE I

```
If (tu_size == 16×4) {
    return TX_SET_Y;
} else if (tu_size == 4×16) {
    return TX_SET_Z;
}
```

In Table I, TX_SET_Y is a subset of the available transform types and includes the transform types {H-DCT, H-ADST, H-FLIPADST, IDTX}; and TX_SET_Z is a subset of the available transform types and includes the transform types {V-DCT, V-ADST, V-FLIPADST, IDTX}. As such, only two (2) bits would be required to code the transform type for blocks that are either 16×4 or 4×16 in size.

As such, at 704_2, it is determined whether the transform block is smaller than the predefined block size. If so, then the default transform type is selected for the horizontal and vertical transform types, at 704_4; otherwise, the technique 700 proceeds to 704_6. At 704_6, it is determined whether the width of the transform block is equal to the threshold size. If so, a default transform type is selected as the horizontal transform type, at 704_8. At 704_10, it is determined whether the height of the transform block is equal to the threshold size. If so, the default transform type is also selected as the vertical transform type, at 704_12.

As such, the encoder need not encode, and the decoder need not decode the transform type(s) when the transform block size (or dimensions) satisfy the criteria (conditions) described above. That is, the transform type(s) can be inferred.

In an example, if the dimensions and size of the transform block do not meet the above conditions, then the transform type can be based on the prediction mode associated with the transform block. As mentioned, the prediction mode associated with the transform block is the coding mode of the coding block from which the transform block is obtained. As such, a prediction mode associated with the transform block can be identified; a subset of available transform types is identified based on the prediction mode; and an index into the subset of the identified transform type is coded. When implemented by the decoder, identifying a prediction mode associated with the transform block may include decoding the prediction mode from the compressed bitstream.

The encoder and decoder can include a mapping that maps particular prediction modes to subsets of the available transform types. The mapping may be implemented as a lookup table or in the form of executable instructions that essentially apply conditional logic to identify transform types based on a transform block size and a prediction mode. As such, when implemented in an encoder, the encoder may identify the possible transform types based on the mapping from amongst transform types available for the prediction mode of the coding block. Table II illustrates an example of selecting a transform type based on prediction mode and transform block size.

TABLE II

```
If (tu_size == 8×8 && optical_flow == TRUE) {
    Return TX_SET_DCTONLY; // transform type is not signaled
} Else if ((tu_size == 16×8 || tu_size == 8×16) && optical_flow ==
TRUE) {
    Return TX_SET_INTER_3; // 1 bit is used for coding the transform
```

TABLE II-continued

```
    type
} Else if (tu_size == 16×16 && optical_flow == TRUE &&
    pred_mode == NEW_NEWMV_OPTFLOW ) {
    Return TX_SET_X; // 3 bits are used for coding the transform type
}
```

In Table II, TX_SET_DCTONLY is a subset of the available transform types and include only the DCT_DCT transform type; TX_SET_INTER_3 may be a subset that includes {DCT_DCT, IDTX}; and TX_SET_X may be a subset that includes permutation of DCT, ADST, and IDTX. As such, if the transform block size is 8×8 and the prediction mode uses optical motion, then only the DCT_DCT transform type is possible and the transform type need not be signaled (again, since only one transform type is possible). If the transform block size is 16×8 or 8×16 and the prediction mode is or uses optical motion, then 1 bit would be required to code the transform type. If the transform block size is 16×16 and the prediction mode is NEW_NEWMV_OPTFLOW, then 3 bits would be required to code the transform type. The NEW_NEWMV_OPTFLOW mode means to use the NEW_NEWMV compound prediction mode, as defined by the AV1 coded, with optical flow motion vector refinement.

Optical_flow in Table II indicates a set a coding modes that refine motion vectors subblock wise in compound prediction to enhance inter prediction quality. A binary symbol use_optflow may be included in the compressed bitstream to indicate whether optical flow is enabled for a block. When optical flow is used, one of the possible prediction modes is referred to as NEW_NEWMV_OPT-FLOW (e.g., a NEW_NEWMV mode with optical flow motion vector refinement). Other prediction modes encompassed by optical flow include NEAR_NEARMV_OPT-FLOW (e.g., a NEAR_NEARMV mode with optical flow motion vector refinement), NEAR_NEWMV_OPTFLOW (a NEAR_NEWMV mode with optical flow motion vector refinement), and NEW_NEARMV_OPTFLOW (a NEW_NEARMV mode with optical flow motion vector refinement). These inter compound prediction modes with optical flow motion vector refinement may be referred as "optical flow modes," and the reference motion vector types may be defined as in the conventional compound modes (e.g., NEAR_NEWMV_OPTFLOW having the same reference MV types as in NEAR_NEWMV), such as used and defined by the AV1 codec. These compound prediction optical flow modes may be performed based on the sub-block-wise refined MVs instead of the original MVs At 706, the transform type is applied to the transform block. When implemented in an encoder, applying the transform type to the transform block means transforming the portion of the residual block coextensive the transform block to the frequency domain by applying the transform type. When implemented in a decoder, applying the transform type to the transform block means applying the inverse transform to obtain the portion of the residual block coextensive the transform block.

The technique 700 may generally encode a syntax element indicating whether a transform block should be split into smaller blocks. For example, if the syntax element is equal to 1 then the transform block should be split into smaller transform sizes; and a value of 0 specifies that the block should not be split. For certain transform block sizes, the technique 700 does not code whether the transform block is further split, and it can be assumed (e.g., inferred) that the transform is not further split.

As such, the technique 700 can determine, based on the size of the transform block, that the transform block is not split into sub-blocks. For example, if the transform block size is 8×4 or 4×8, then the decoder can infer, and the encoder does not encode that the transform block is not further split into sub-blocks. As such, the value of the syntax element indicating whether the transform block is split into sub-blocks can be inferred in a case that the size is at least one of 8×4 or 4×8. In an example, if the prediction mode is an inter-prediction mode and the transform block has a size that is less than size 16×16, then the transform block is not split further. In an example, if the prediction mode is an intra-prediction mode and the transform block has a size that is less than 8×8, then the transform block is not split further.

Figure 8:
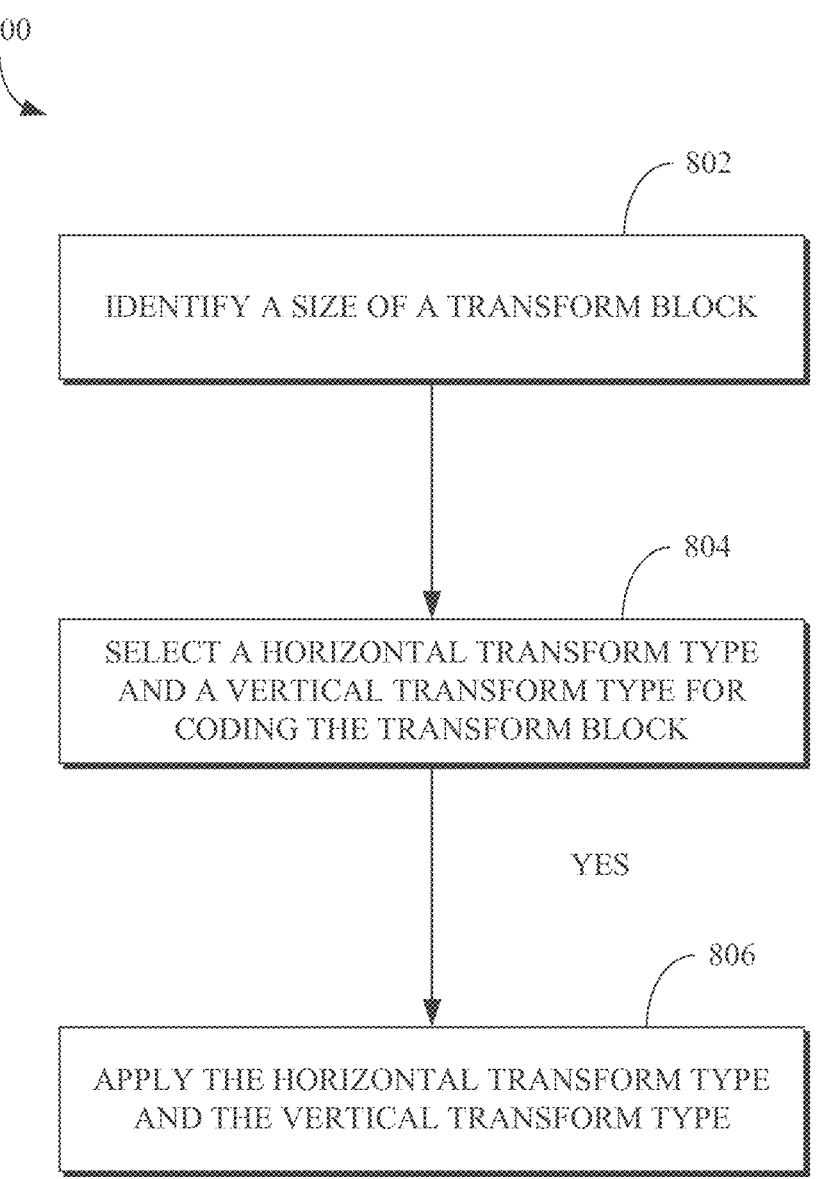
FIG. 8 is a flowchart of a technique for coding a transform block.

FIG. 8 is a flowchart of a technique 800 for coding a transform block. The technique 800 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as the processor 202, may cause the computing device to perform the technique 800. The technique 800 can be implemented using specialized hardware or firmware. Multiple processors, memories, or both, may be used.

The technique 800 may be implemented in whole or in part in the transform stage 404 of the encoder 400 of FIG. 4 and/or the inverse transform stage 506 of the decoder 500 of FIG. 5. When implemented by an encoder, coding a transform block can mean applying a transform, as described with respect to FIG. 4; and when implemented by a decoder, coding a transform block can mean applying an inverse of the transform, as described with respect to FIG. 5.

At 802, a size of the transform block is identified. Identifying the size of the transform block also includes identifying the width and the height of the transform block. When implemented in a decoder, identifying the size can mean or include decoding the width and the height from a compressed bitstream, such as the compressed bitstream 420 of FIG. 5.

At 804, a horizontal transform type and a vertical transform type for coding the transform block are selected for coding the transform block. As described with respect to FIG. 7, the horizontal transform type and the vertical transform type can be inferred in some cases, based on the size or dimensions of the transform block. As such, the technique 800 can determine whether the size and dimensions of the transform block meet size-based transform type selection criteria. If so, then at least one of the horizontal transform type or the vertical transform type can be selected as described above. The size-based transform type selection criteria can include, for example, whether the block is smaller than a predefined block size and whether a width or a height of the transform block are equal to a threshold size.

If the size and the dimensions of the transform block do not meet the size-based transform type selection criteria, then at least one of the horizontal transform type or the vertical transform type are selected based on a coding mode corresponding to the transform block. Which of the horizontal transform type or the vertical transform type is selected based on the coding mode depends on which of the dimensions does not satisfy the size-based transform type selection criteria.

At 806, the horizontal transform type and the vertical transform type are applied to the transform block, which can be as described above.

Another aspect of the disclosed implementations is a technique that includes identifying a size of a transform block; selecting a horizontal transform type and a vertical transform type for coding the transform block; and applying the transform type to the transform block. Selecting the horizontal transform type and the vertical transform type includes determining that the size and dimensions of the transform block do not meet size-based transform type selection criteria; and, in response to determining that the size and the dimensions of the transform block do not meet the size-based transform type selection criteria, selecting at least one of the horizontal transform type or the vertical transform type based on a coding mode corresponding to the transform block.

For simplicity of explanation, the techniques 700 and 800 of FIGS. 7 and 8, respectively, are each depicted and described as respective series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor (that is, the computer-readable medium can be a non-transitory computer-readable storage medium). The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for coding a transform block, comprising:
 identifying a size of the transform block;
 identifying a transform type for the transform block, wherein the transform type comprises a horizontal transform type and a vertical transform type, and wherein identifying the transform type comprises:
  determining whether the size of the transform block is below a predefined block size;
  in response to determining that the size is below the predefined block size, selecting a default transform type for each of the horizontal transform type and the vertical transform type; and in response to determining that the size is not below the predefined block size and that one of a width or a height of the transform block is equal to a minimum threshold transform dimension size, selecting the default transform type for the one of the width or the height of the transform block that is equal to the minimum threshold transform dimension size; and applying the transform type to the transform block.

2. The method of claim 1, wherein the threshold size is 4.

3. The method of claim 1, wherein identifying the transform type further comprises:

in response to determining that the size is not below the predefined block size:

identifying a prediction mode associated with the transform block;

identifying a subset of available transform types based on the prediction mode; and coding an index into the subset of the transform type.

4. The method of claim 1, further comprising:

determining based on the size of the transform block that the transform block is not split into sub-blocks.

5. The method of claim 4, further comprising:

inferring a syntax element indicating whether the transform block is split into the sub-blocks based on the size.

6. The method of claim 1, wherein the default transform type is a discrete cosine transform.

7. A device, comprising:

a processor configured to execute instructions for coding a transform block, the instructions comprise to:

identify a size of the transform block;

identify a transform type for the transform block, wherein the transform type comprises a horizontal transform type and a vertical transform type, and wherein identifying the transform type comprises:

determine whether the size of the transform block is below a predefined block size;

in response to determining that the size is below the predefined block size, select a default transform type for each of the horizontal transform type and the vertical transform type;

in response to determining that the size is not below the predefined block size and that one of a width or a height of the transform block is equal to a minimum threshold transform dimension size, select the default transform type for the one of the width or the height of the transform block that is equal to the minimum threshold transform dimension size; and apply the transform type to the transform block.

8. The device of claim 7, wherein the threshold size is 4.

9. The device of claim 7, wherein the instructions to identify the transform type further comprise instructions executable by the processor to:

in response to determining that the size is not below the predefined block size:

identify a prediction mode associated with the transform block;

identify a subset of available transform types based on the prediction mode; and code an index into the subset of the transform type.

10. The device of claim 7, wherein the processor is further configured to execute instructions to:

determine based on the size of the transform block that the transform block is not split into sub-blocks.

11. The device of claim 10, wherein the processor is further configured to execute instructions to:

infer a syntax element indicating whether the transform block is split into the sub-blocks based on the size.

12. The device of claim 10, wherein the default transform type is a discrete cosine transform.

13. A non-transitory computer-readable storage medium having stored thereon an encoded bitstream, wherein the encoded bitstream is configured for decoding by operations comprising:

identifying a size of a transform block;

identifying a transform type for the transform block, wherein the transform type comprises a horizontal transform type and a vertical transform type, and wherein identifying the transform type comprises:

determining whether the size of the transform block is below a predefined block size;

in response to determining that the size is below the predefined block size, selecting a default transform type for each of the horizontal transform type and the vertical transform type;

in response to determining that the size is not below the predefined block size and that one of a width or a height of the transform block is equal to a minimum threshold transform dimension size, selecting the default transform type for the one of the width of the height of the transform block that is equal to the minimum threshold transform dimension size; and applying the transform type to the transform block.

14. The non-transitory computer-readable storage medium of claim 13, wherein the default transform type is a discrete cosine transform and the threshold size is 4.

15. The non-transitory computer-readable storage medium of claim 13, wherein identifying the transform type further comprises:

in response to determining that the size is not below the predefined block size:

identifying a prediction mode associated with the transform block;

identifying a subset of available transform types based on the prediction mode; and coding an index into the subset of the transform type.

16. The non-transitory computer-readable storage medium of claim 13, the operations further comprising:

determining based on the size of the transform block that the transform block is not split into sub-blocks.

17. The non-transitory computer-readable storage medium of claim 16, the operations further comprising:

inferring a syntax element indicating whether the transform block is split into the sub-blocks based on the size.

18. The method of claim 3, wherein the prediction mode is an optical flow mode that refines motion vectors subblock-wise.

19. The method of claim 3, wherein the prediction mode is a compound prediction mode.

20. The method of claim 3, wherein identifying the subset of available transform types based on the prediction mode comprises:

in response to the size of the transform block being 8×8 and the prediction mode being an optical flow mode, identifying a subset comprising only a DCT_DCT transform type.

\* \* \* \* \*